No. 806,600. PATENTED DEC. 5, 1905.
R. C. TURNER.
PROCESS OF STERILIZING MILK AND OTHER LIQUIDS.
APPLICATION FILED JAN. 25, 1904.
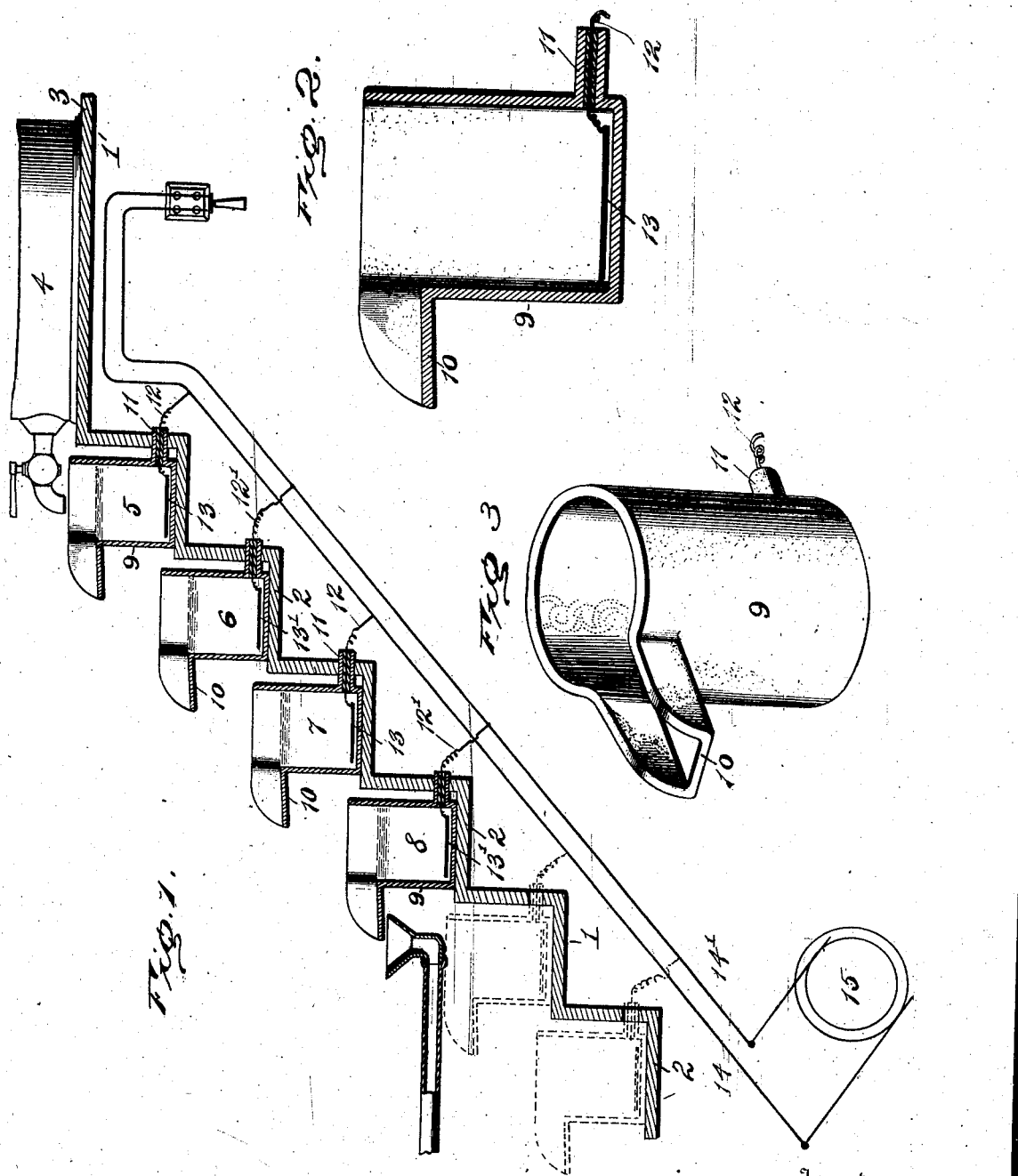

UNITED STATES PATENT OFFICE.

ROBERT C. TURNER, OF COLUMBUS, OHIO.

PROCESS OF STERILIZING MILK AND OTHER LIQUIDS.

No. 806,600.    Specification of Letters Patent.    Patented Dec. 5, 1905.

Application filed January 25, 1904. Serial No. 190,538.

*To all whom it may concern:*

Be it known that I, ROBERT C. TURNER, a citizen of the United States, residing at Columbus, in the county of Franklin and State of Ohio, have invented certain new and useful Improvements in Processes of Sterilizing Milk and other Liquids, of which the following is a specification, reference being had therein to the accompanying drawings.

This invention relates to an improved method for treating milk and other liquids for the purpose of purifying, sterilizing, and otherwise modifying them by the electric current.

Figure 1 is a side view of an apparatus embodying my improvements and more or less conventionally illustrated. Fig. 2 is a vertical section of one of the vessels for holding the liquid during the time of treatment. Fig. 3 shows detached and in perspective one of the vessels used in the process.

In the drawings a supporting-frame 1 is shown, it having the horizontal step-like parts 2 2 and a platform 3. Upon the platform 3 is mounted the initial tank or receptacle 4, which contains the liquid that is to be treated by the apparatus below it.

Inasmuch as I am at present employing the present apparatus and method largely in the treatment of milk, I will herein refer more specifically to that liquid; but I wish it understood that I do not limit the invention thereto.

Upon each of the steps 2 2 there is supported a milk vessel, and while these are substantially similar to each other I have for convenience designated them in the drawings in series as 5, 6, 7, and 8. These are each preferably made of a material which is non-conducting as to electricity and suitable for the holding of the milk or other liquid. Preferably I make them of earthenware, although glass can be substituted, if desired. Each is formed with a main body part 9, adapted to hold a body of milk, and also formed with a relatively long spout 10, along and through which the milk flows from an upper vessel to a lower one. These vessels 5 6, &c., are preferably so arranged that the tip of the nozzle or the spout of the upper one shall deliver the milk near the inner wall of the next lower one, so as to insure that the liquid shall circulate as thoroughly as possible through the body parts of all of the vessels in series and prevent it from escaping too quickly from the top of one through its spout to the next lower.

If the vessel 5 be formed of porcelain or earthenware, it is at the time of manufacture provided with a tube or perforated projection 11, extending outward from one of its sides and on horizontal lines near its bottom. Through this is passed the terminal of an electric conductor 12, which terminates in an electrode 13 at the bottom of the interior chamber.

For understanding some of the features of the present invention the series as an entirety 5 6 7 8, &c., of milk vessels may be regarded as divided into sets, each set having two vessels. Thus the vessels at 5 and 6 constitute one set, and those at 7 and 8 another, and so on. It will be understood, however, that the number in each set may be varied according to preference or as circumstances may dictate. The vessel 6 of the first set or pair herein is constructed in the manner described for the receptacle 5—that is to say, it has a tube 12 formed therewith, having an electric conductor 12' sealed and insulated therein and the electrode 13' in the bottom of its interior.

14 indicates the positive and 14' the negative side of an electric circuit connected to any suitable source of supply. I prefer to connect it to means for supplying a powerful alternating current, such as indicated at 15.

With the mains 14 14' the electrodes in the pairs of vessels (5 6 and 7 8, and so on) are connected in multiple, those of each pair being in series with each other—that is to say, the electrode 13 in the vessel 5 is in series with the electrode 13' in the vessel 6; but when they are considered as a pair of receptacles each in series with the other they both are in multiple with those of the other pairs in the vessels 7 8, and so on. The conductor 12 is connected to the side 14 of the main circuit and the conductor 12' to the side 14'.

The method of operation of the mechanism illustrated will be readily understood. The initial tank or receptacle 4 being supplied with a quantity of milk or liquid to be treated, it is allowed to run therefrom into the upper receptacle 5, and after that is filled it flows through its spout to the next at 6, then from that to the next at 7, and so on through the series, the stream of liquid being continuous. At the same time, current being supplied to the circuit 14 14', the electricity travels in multiple paths. It passes, for instance, through the wire 12 to the electrode 13 in the bottom of the first receptacle 5, then upward through the body of milk therein, thence along the spout 10 and down with the stream into the body of the liquid in the second vessel 6 to the electrode 13', and thence out on the return-wire 12' to the lower side 14' of the main line. Similarly a branch current is passed to and from the electrodes 13 13' in the vessels 7 and 8 and through the bodies of the liquid therein and along the spout of the vessel 7.

As above remarked, the connecting up of the different cells or receptacles with the main line will be varied to suit the different kinds or grades of liquid which passes through the apparatus or to vary the results attained. Instead of coupling them in such way as to have two in a set, which two are electrically in series, they may be connected so as to have three in a set, the entire series in such case being a multiple of three. Care is to be taken that the electrical resistances in all of the sets are equal. This can be accomplished by having the receptacles uniform in their dimensions and spaced so that the distances between them shall be equal, or it can be accomplished in any way well known to the electrician, as by inserting resistances in the circuits where required.

Ordinarily in the treatment of common milk I have found that with the arrangement illustrated with the entire series of cells or receptacles divided up into pairs or sets of two and with the pairs in multiple with the main supply-circuit the best results are attained, provided, of course, the dimensions of the cells are properly related to the strength and quantity of the current delivered. If the path of the milk is too much prolonged, excessive heating results, which it is desirable to avoid.

The current used being alternating, the well-known results are attained with respect to the destruction of organic life; but I do not wish the novel features of the process or apparatus limited to any particular character of current.

What I claim is—

1. The herein-described method of treating milk or other liquids, it consisting in causing the milk to pass through each vessel in a series of vessels and to flow in a stream from one vessel to the next, and simultaneously causing an electric current to pass from the bottom of one vessel upward through the body of milk therein, then downward through the stream falling from said vessel to the next, then downward through the body of milk in said next vessel and thence out, substantially as set forth.

2. The herein-described process for treating milk and other liquids, it consisting in causing the milk or liquid to flow continuously through each vessel of a series of vessels and flow in a stream from each vessel to the next, applying several branch currents of electricity in multiple from a common source to several sets of the said vessels respectively, the vessels of each set being arranged electrically in series and causing electricity to pass from the bottom of one of said vessels through the milk therein to the top and along the stream passing from said vessel to the next and finally out at the bottom of the last vessel in said set, substantially as set forth.

3. The herein-described method of treating milk, it consisting in causing the milk to flow from one vessel to another arranged electrically in series with the first, and simultaneously causing a current of electricity to pass through the milk in both vessels upwardly through one and downwardly through the other, the stream of milk flowing from one to the other completing the electrical circuit between the vessels, substantially as set forth.

4. The herein-described process of treating milk and other liquids, it consisting in causing the milk or other liquid to flow continuously through each vessel of a series of vessels and to flow in a stream from the top of each vessel to the next, and causing several branch currents of electricity in multiple from a common source to pass through the liquid in sets of the said vessels respectively, the vessels of each set being arranged electrically in series, and the stream of milk from each vessel to the next completing the electrical circuit between the said vessels, substantially as set forth.

5. The herein-described process for treating milk and other liquids, it consisting in causing the milk or other liquid to overflow continuously from each vessel of a series of vessels and to flow in a stream from each vessel to the next, causing several branch currents of electricity in multiple from a common source to pass through the liquid in sets of the said vessels respectively, and regulating the electrical resistance in each of the said sets of vessels, the vessels of each set being arranged electrically in series and the stream of liquid from each vessel to the next completing the electrical circuit between said vessels, substantially as set forth.

6. The herein-described method of treating milk and other liquids, consisting in causing the milk to flow from a relatively large body in one non-conducting vessel to a relatively large body in a second non-conducting vessel in a reduced attenuated stream, and simultaneously causing an electric current to flow from an electrode immersed in the liquid in one of said vessels, through said liquid and longitudinally along said stream to an immersed electrode in the other of said vessels.

In testimony whereof I affix my signature in presence of two witnesses.

ROBERT C. TURNER.

Witnesses:
C. B. WOLFE,
C. R. MAYERS.